(12) United States Patent
Fuchs et al.

(10) Patent No.: US 7,685,726 B2
(45) Date of Patent: Mar. 30, 2010

(54) METHOD FOR PROBING A WORKPIECE USING A COORDINATE MEASURING MACHINE AND COORDINATE MEASURING MACHINES

(75) Inventors: Andreas Fuchs, Aalen (DE); Hermann Deeg, Aalen (DE); Heinz Peter, Ulm (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 251 days.

(21) Appl. No.: 11/995,519

(22) PCT Filed: Jul. 3, 2006

(86) PCT No.: PCT/EP2006/006456

§ 371 (c)(1),
(2), (4) Date: Jan. 11, 2008

(87) PCT Pub. No.: WO2007/006448

PCT Pub. Date: Jan. 18, 2007

(65) Prior Publication Data

US 2008/0189969 A1    Aug. 14, 2008

(30) Foreign Application Priority Data

Jul. 13, 2005   (DE) ............... 10 2005 032 749

(51) Int. Cl.
*G01B 5/008* (2006.01)
*G01B 5/012* (2006.01)

(52) U.S. Cl. .............. 33/503; 73/1.79; 73/1.81; 33/504; 33/554; 33/556; 702/95

(58) Field of Classification Search ............ 73/1.79, 73/1.81; 33/503, 504, 554, 556; 702/94, 702/95
See application file for complete search history.

(56) References Cited

U.S. PATENT DOCUMENTS

| 3,633,011 | A | * | 1/1972 | Bederman et al. ........... 700/192 |
| 4,167,066 | A | * | 9/1979 | Cooper et al. ................. 33/504 |
| 4,222,238 | A | | 9/1980 | McCulloch |
| 4,457,074 | A | | 7/1984 | Golder et al. |
| 5,189,806 | A | | 3/1993 | McMurtry et al. |
| 5,471,406 | A | | 11/1995 | Breyer et al. |
| 5,501,096 | A | * | 3/1996 | Stettner et al. ............... 73/1.79 |
| 5,726,917 | A | | 3/1998 | Staaden et al. |
| 5,764,540 | A | | 6/1998 | Grupp et al. |

(Continued)

FOREIGN PATENT DOCUMENTS

DE   296 12 861   10/1996

(Continued)

OTHER PUBLICATIONS

English Translation issued in DE Patent No. 19900737, dated Jul. 27, 2000 (17 Pages).

(Continued)

*Primary Examiner*—Randy W Gibson
(74) *Attorney, Agent, or Firm*—Osha • Liang LLP

(57) ABSTRACT

In probing by scanning a workpiece (71) to be measured using a coordinate measuring machine a stylus tip is moved before the scanning along a scanning path (73) along an initialization path (83) or/and after the scanning path (73) along a finalization path (85). A length ($L_v$, $L_n$) of the initialization path, respectively finalization path, is chosen in dependence of parameters of a concrete measuring task, in particular in dependence of a pre-determined scanning speed, a stiffness of the stylus or a mass of the stylus.

38 Claims, 3 Drawing Sheets

U.S. PATENT DOCUMENTS

Figure 1:
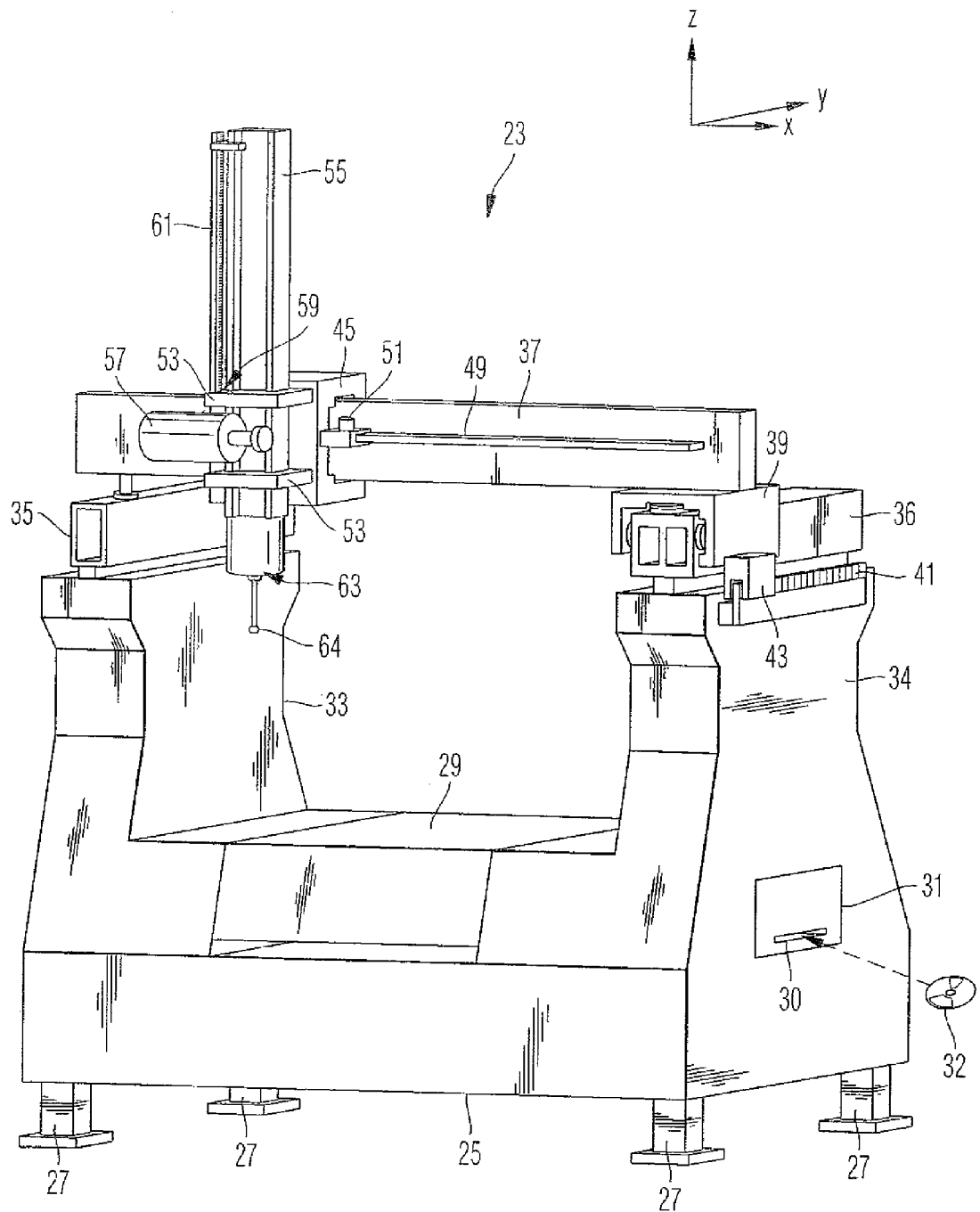

| | | | |
|---|---|---|---|
| 5,895,444 | A | 4/1999 | Ruck et al. |
| 5,966,681 | A | 10/1999 | Bernhardt et al. |
| 6,092,411 | A * | 7/2000 | Tokoi .................. 73/1.79 |
| 6,457,251 | B1 * | 10/2002 | Feltner et al. .............. 33/567 |
| 6,568,242 | B2 | 5/2003 | Nai et al. |
| 6,909,983 | B2 * | 6/2005 | Sutherland ............... 702/104 |
| 7,055,367 | B2 * | 6/2006 | Hajdukiewicz et al. ...... 73/1.79 |
| 7,254,506 | B2 * | 8/2007 | McMurtry et al. ........... 702/95 |
| 7,293,365 | B2 * | 11/2007 | McMurtry et al. ........... 33/556 |
| 7,318,284 | B2 * | 1/2008 | McMurtry et al. ........... 33/503 |
| 7,543,393 | B2 * | 6/2009 | McMurtry et al. ........... 33/502 |
| 2002/0029119 | A1 | 3/2002 | Lotze et al. |
| 2005/0102118 | A1 * | 5/2005 | Grupp et al. .............. 702/150 |
| 2008/0307662 | A1 * | 12/2008 | Fuchs et al. ................ 33/503 |

FOREIGN PATENT DOCUMENTS

| | | |
|---|---|---|
| DE | 19753303 | 6/1998 |
| DE | 19730471 | 2/1999 |
| DE | 19900737 | 7/2000 |
| DE | 10050795 | 7/2001 |
| DE | 10124493 | 11/2001 |
| DE | 10229821 | 1/2004 |
| DE | 4245012 | 9/2004 |
| EP | 0 240 151 | 10/1987 |
| EP | 0849653 | 6/1998 |
| WO | WO-2004/020939 | 3/2004 |

OTHER PUBLICATIONS

English Translation issued in DE Patent No. 10229821, dated Jan. 15, 2004 (33 Pages).

International Standard ISO 10360-1; First Edition; Geometrical Product Specifications (GPS)—Acceptance and reverification tests for coordinate measuring machines (CMM); Part 1: Vocabulary; ISO 2000.

English Translation issued in DE Patent No. 19730471, dated Feb. 11, 1999 (17 Pages).

English Translation issued in DE Patent No. 10050795, dated Jul. 5, 2001 (29 Pages).

International Search Report (German and English) for PCT/EP2006/006456 mailed Sep. 29, 2006 (7 pages).

* cited by examiner

METHOD FOR PROBING A WORKPIECE USING A COORDINATE MEASURING MACHINE AND COORDINATE MEASURING MACHINES

The invention relates to a method for probing a surface of a workpiece with a coordinate measuring machine and to a coordinate measuring machine adapted for performing the method.

A coordinate measuring machine is employed to measure coordinates of surface points of a workpiece. A conventional coordinate measuring machine comprises a workpiece holder for mounting the workpiece to be measured and a probe for probing the surface of the workpiece. For this, the coordinate measuring machine comprises several components displaceable relative to each other one of which is rigidly connected to the workpiece holder and another carries the probe, wherein one or more drives are provided for the components, to displace the probe relative to the workpiece holder. The probe carries a stylus with a stylus tip held at a stylus shaft which stylus tip is brought into contact with the workpiece surface for probing the workpiece surface. With established contact between the stylus tip and the surface the coordinates of the corresponding contact point are measured by the coordinate measuring machine. Scanning denotes a particular probing mode with which measuring points are continuously acquired, to characterize lines on the surface to be measured. Thereby, upon maintaining the contact between the stylus tip and the surface, the stylus tip is guided along a scanning path with a scanning speed, wherein at a plurality of contact points along the scanning path coordinate values of the contact points are measured.

When the stylus tip is brought into contact with the surface and when then the stylus tip is accelerated to the scanning speed relative to the surface, in the whole system oscillations evolve which lead to corruptions of the measured values. Accordingly also oscillations occur, when the speed of the stylus tip relative to the surface is reduced towards the endpoint of the scanning path. Also here, by virtue of the changing the cinematic relationships, in particular due to oscillations, corruptions of the measured values evolve.

When a conventional measuring task for example consist of measuring a surface of a cylinder along a closed circular line, the corresponding scanning path is chosen such that the circular line is doubly measured within an overlap of 90 degrees. Then measuring points disturbed by initial oscillation phenomena at a beginning of the scanning path and at an end of the scanning path are abolished, that means they are not taken into account in the further analysis, wherein however the overlap of 90 degrees is in most cases dimensioned sufficiently large, so that a central region of the scanning path not disturbed by the initial oscillation processes comprises a full perimeter of the circle.

It is an object of the present invention to propose a method for probing a surface of a workpiece to be measured with a coordinate measuring machine by scanning in which initial oscillation processes evolving at a beginning and at an end of a scanning path are sufficiently taken into account.

Further, it is an object of the present invention, to propose a corresponding coordinate measuring machine.

According to the invention a method for probing a surface of a workpiece to be measured with a coordinate measuring machine is proposed, wherein the surface is scanned with a stylus tip along a scanning path extending between a scanning starting point and a scanning end point with a scanning speed. To take initial oscillation phenomena into account, the stylus tip is however not brought into contact with the surface of the workpiece at the scanning starting point and then the scanning movement is started, but instead the stylus tip is brought into contact with the surface of the workpiece at an initialization path starting point removed by a distance from the scanning starting point, and the stylus tip is then moved along an initialization path extending between the initialization path starting point and the scanning starting point and is accelerated to the scanning speed such that upon traversing the scanning starting point the stylus tip already exhibits the scanning speed relative to the surface and initial oscillation phenomena have already decayed.

Thereby a length of the initialization path is not fixedly predetermined but instead is adapted to measuring conditions concretely present. Thus it is possible to optimize the length of the initialization path and the time required for traversing the same so that for particular measuring conditions a throughput due to a fixedly predetermined too large length of the initialization path is reduced. Thereby it is also avoided that the initialization path, respectively the finalization path, is not chosen too small for particular measuring conditions.

Examples of parameters in dependence of which the length of the initialization path is determined for concrete measuring tasks are the value of the pre-determined scanning speed, a stiffness of the stylus used for performing the measuring task and a mass of the used stylus.

When, according to an exemplary embodiment of the invention, a workpiece is for example scanned with a large scanning speed and then this workpiece or another workpiece is scanned with a smaller scanning speed compared thereto, the length of the initialization path for the scanning with the larger scanning speed is chosen longer than the corresponding initialization path for the scanning with the smaller scanning speed. This is based on the consideration that an acceleration of the stylus tip to a comparably larger scanning speed comparably causes stronger and longer prevailing initial oscillation phenomena which are taken into account with a larger length of the initialization path.

According to another exemplary embodiment a workpiece is scanned with a stylus tip with a comparably large stiffness and then the same workpiece or another workpiece is scanned with another stylus tip with a comparably lower stiffness. Thereby, for the scanning with the stylus tip having the larger stiffness a shorter length of the initialization path is chosen than for the scanning with the stylus having the lower stiffness.

According to a further exemplary embodiment a workpiece is first scanned with a stylus of a comparably larger mass and then the same workpiece or a workpiece different therefrom is scanned with a stylus with a comparably smaller mass. Thereby the length of the initialization path for the scanning with the stylus of the larger mass is chosen longer than for the scanning with the stylus having the smaller mass.

The same considerations for determining the length of the initialization path may also be applied to the determining a length of a finalization path such that the stylus is not only moved up to the scanning endpoint along the scanning path, but is moreover moved further still along a finalization path extending between the scanning endpoint and a finalization path endpoint along the surface of the workpiece such that initial oscillation processes, respectively oscillation processes occurring at the end can not influence the measuring during the scanning up to the scanning endpoint. Thus, also the length of the finalization path can be determined in dependence of the scanning speed, the stiffness of the stylus or the mass of the stylus. The movement of the stylus along the finalization path may be carried out in addition to the movement along the initialization path. However, it is also provided that the movement along the finalization path is employed without the need that the stylus has traversed an initialization path in front of the scanning starting point.

According to an exemplary embodiment the length of the initialization path is larger than the length of the finalization path.

According to another exemplary embodiment the scanning speed during the scanning along the scanning path is essentially constant such that due to changing the value of the scanning speed no additional initial oscillation phenomena are produced.

According to a further aspect of the present invention a coordinate measuring machine is provided which exhibits a workpiece holder, a probe, at least one drive for displacing the probe relative to the workpiece holder, and a controller, wherein the controller is adapted to control the coordinate measuring machine for performing the previously described method in which before a scanning the surface of a workpiece along a scanning path a moving the stylus tip along an initialization path and/or after the scanning a moving the stylus tip along a finalization path is performed, wherein a length of the initialization path, respectively a length of the finalization path, is chosen in dependence of parameters of a concrete measuring situation.

Among a further aspect the invention provides a computer readable carrier which carries information which represent a controlling program that is adapted to cause a controlling a coordinate measuring machine, to perform the previously explained method. The computer readable carrier may be any appropriate carrier, such as a solid body storage, a magnetic storage, an optical storage, or it may comprise modulated waves, respectively signals, which are suitable for transferring by a network, such as the internet.

Figure 2:
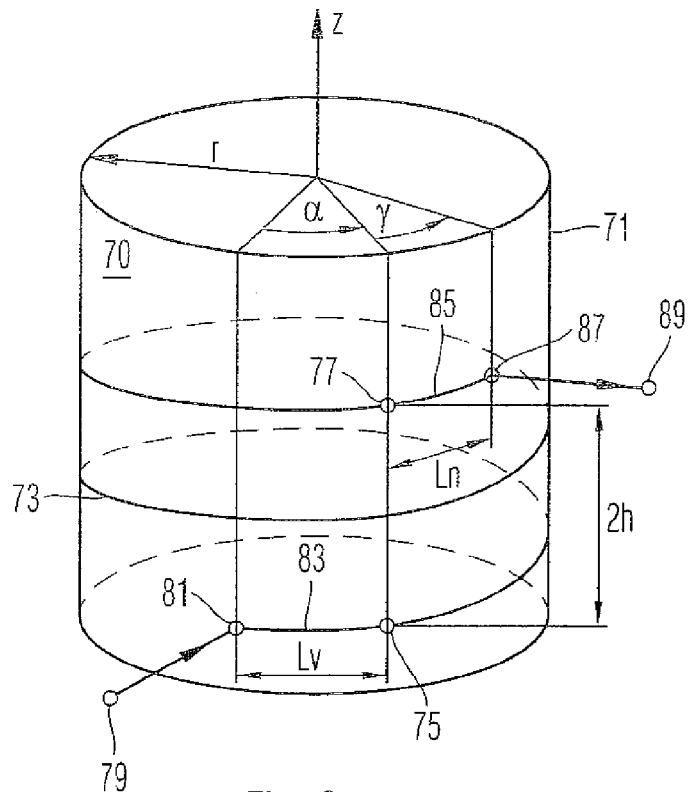
Figure 3:
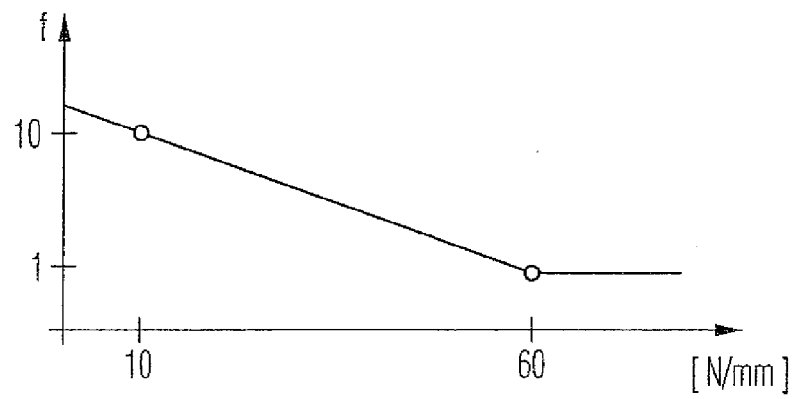
Figure 4:
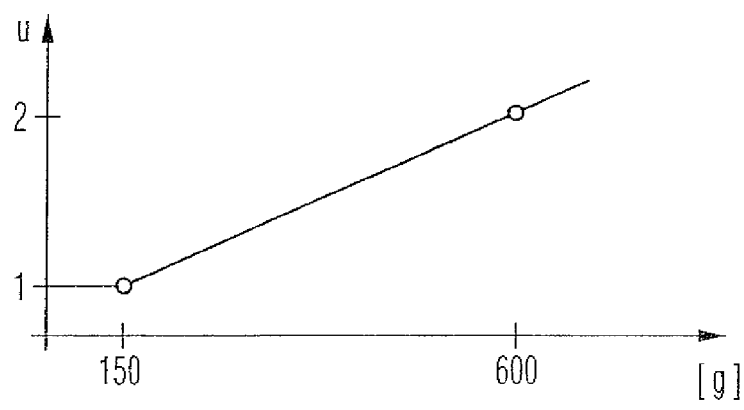
Figure 5:
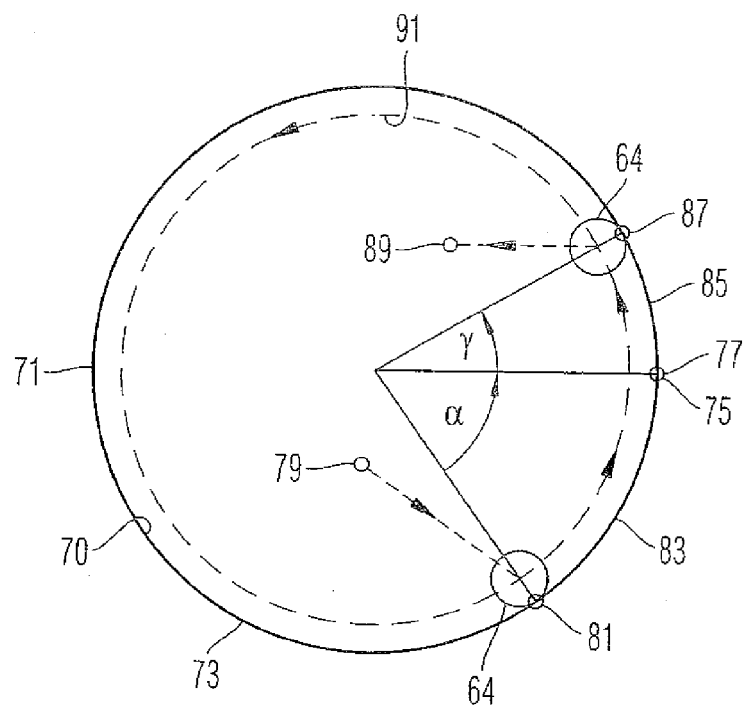
Figure 6:
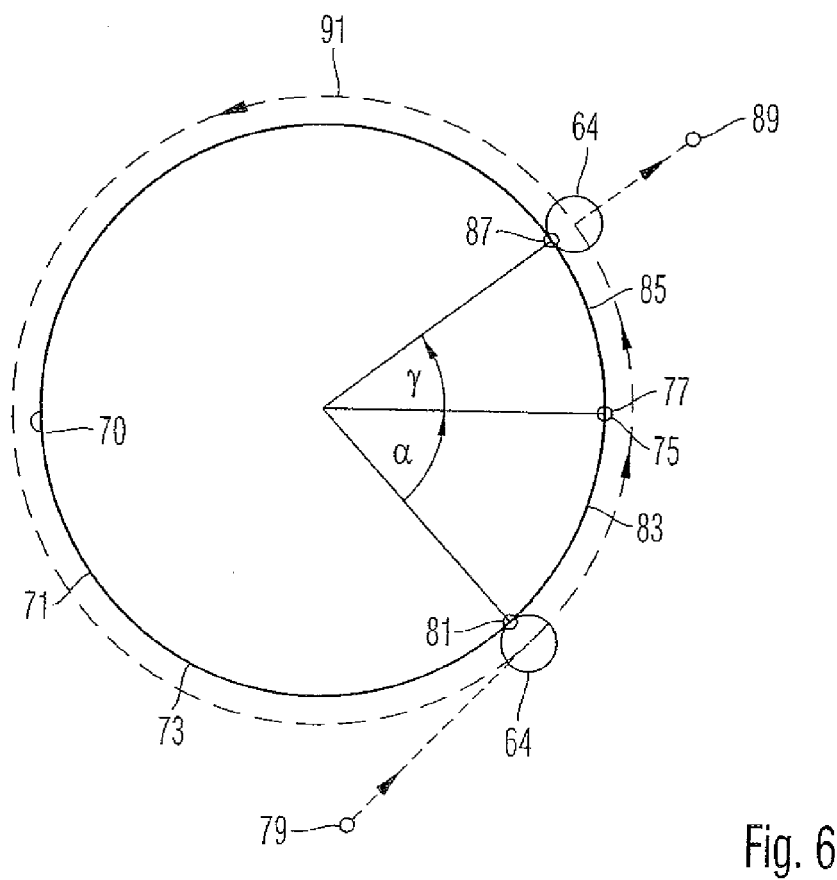

Subsequently, embodiments of the invention will more closely be explained by means of drawings. Hereby FIG. 1 shows an embodiment of a coordinate measuring machine according to the invention, FIG. 2 shows an explanatory illustration for an embodiment of a method according to the invention for probing a surface of a workpiece to be measured, FIG. 3 shows a dependence of a correction factor of a stiffness of a stylus used in the method according to FIG. 2, FIG. 4 shows a dependence of a correction factor of a mass of a stylus used in the method according to FIG. 2, FIG. 5 shows an explanatory illustration of an embodiment of the method for scanning along a closed scanning path on an inner cylinder surface, and FIG. 6 shows an explanatory illustration of an embodiment of the method for scanning along a closed scanning path on an outer cylinder surface.

FIG. 1 shows an embodiment of a coordinate measuring machine according to the invention using a coordinate measuring machine 23 in moving bridge construction as an example. The elements of the coordinate measuring machine and the method performed therewith are denoted in the present application, as far as practical, in accordance to the European norm EN ISO 10360-1:2000.

The coordinate measuring machine comprises a base 25 with feet 27. The base 25 comprises in its centre a workpiece holder or a workpiece support 29 on which a workpiece to be measured is to be arranged. At both sides of the workpiece holder 29 struts 33, 34 extend at the base 25 upwards which carry longitudinal guideways 35, 36 arranged to both sides of the workpiece holder 29, extending in a horizontal y-direction and parallel to each other. A traverse guideway 37 extends orthogonally to the longitudinal guideways 35, 36 in x-direction which is held at the longitudinal guideways 35, 36, linearly displaceable in the y-direction. For this at one end of the traverse guideway 37 a guiding profile 39 is provided which engages the longitudinal guideway 36 from above in a U-shaped way and which is guided at the longitudinal guideway for example using air cushions. With its other end the traverse guideway 37 is re-enforced on the upper side of the longitudinal guideway 35 and is also displaceably held relative to it in y-direction. By a motor drive controlled by a controller 31 the traverse guideway 37 may be displaced along the longitudinal guideway 36, wherein a corresponding displacement position in y-direction is acquired by a measuring system which comprises a scale 41 set on the base and a corresponding sensor 43 set on the U-profile 39 for reading the scale 41.

At the traverse guideway 37 a guiding profile 45 is held linearly displaceably in the x-direction, wherein the displacement position in x-direction is also acquired by the measuring system which for this exhibits a scale 49 mounted on the traverse guideway 37 and a corresponding sensor 51 mounted on the guiding profile 45. A drive not illustrated in FIG. 1 is controlled by the controller 31 which drive changes the displacement position of the guiding profile 45 along the traverse guideway 37.

At the guiding profile 45 two further guiding profiles 53 arranged with a distance from each other are provided which displaceably hold, via a motor 57 also controlled by the controller 31, a bar 55 extending in z-direction. The displacement position of the bar 55 in z-direction is acquired via a sensor 59 provided at the vertical guideway 53 which reads the position at a scale 61 arranged at the bar 55. A probe system 63 is held at a ram provided at a lower end of the bar 55. The probe system may comprise a probe extension and/or a probe changing system, to couple the actual probe to the ram. A probing system is in turn coupled to the probe, wherein the probing system may be rigidly coupled to the probe. Also a stylus changing system may be provided, to couple different exchangeable probing systems to the probe. The stylus system may comprise a stylus extension which continuous in a stylus shaft at which end a stylus tip 64 is mounted which is brought into contact with the workpiece surface for measuring the same. The stylus tip 64 may be for example a ruby sphere. The stylus system may also comprise plural styluses extending for example at a stylus extension traversely to each other, to probe surfaces of the workpiece oriented in different directions. In the ram and in the probe or a probe changing system or an inserted probe extension also a pivoting system may be provided, to change an orientation of the probe with respect of the ram such that also an orientation of the stylus in space is changeable, to probe surfaces of workpieces oriented in different directions.

The controller 31 controls via the drives the position of the stylus tip 64 relative to the workpiece holder 29, it registers a contact between the stylus tip and the surface of the workpiece, and it reads the measuring systems of the coordinate measuring machine 23, to measure the coordinates of the position of the stylus tip 64 relative to the workpiece holder 29 as accurately as possible. The controller 31 is merely schematically illustrated in FIG. 1. It can be implemented as a computer comprising interfaces to receive user commands, to control the drives, to read the measuring systems and the like. The computer performs the provided operations according to a program which can be loaded into the computer in different ways. In FIG. 1 a compact disc ROM 32 is schematically illustrated carrying the program information in a computer readable form and which can be inserted into a slot 30 of the controller 31, to load the program into the computer. The program information can however also be loaded into the controller 31 in another way, such as for example via a computer network.

FIG. 2 exemplifies an embodiment of a method for probing an outer lateral surface 70 of a cylinder 71 arranged onto the workpiece holder 29.

It is assumed that the measuring task consists of probing the outer lateral surface 70 of the cylinder with radius r along a scanning path 73 which spirally extends between a scanning starting point 75 and a scanning end point 77 in two cycles with a slope h around a principal axis z of the cylinder 71.

For this the stylus tip 64 is not brought into contact with the cylinder surface 70 directly at the scanning starting point 75. Instead, starting from an assumed intermediate point 79, the stylus tip is moved towards the surface 70, to contact it at an initialization path starting point 81. As soon as the stylus tip is brought into contact with the surface 70 at the initialization path starting point 81, the stylus tip is moved towards the scanning starting point 75 along an initialization path 83. The initialization path 83 has the form of a circle line extending along an angle α around the principle axes of the cylinder with constant height (z=constant) at the outer lateral surface 70 of the cylinder. During the traversing the initialization path 83 exhibiting a length Lv at the cylinder surface 70 the stylus tip 64 is accelerated to the scanning speed relative to the surface 70, wherein the stylus tip is already at the beginning of the traversing the initialization path 83 brought to the scanning speed and traverses the comparably largest part of the length Lv towards the scanning starting point 75 already having the scanning speed. Until that point in time, where the stylus tip traverses the scanning starting point 75, initial oscillation phenomena evolving by virtue of the acceleration and of the bringing into contact the stylus tip with the surface have essentially decayed.

After traversing the scanning starting point 75 the stylus tip is spirally scanned along the scanning path 73 up to the scanning end point 77, wherein the scanning speed relative to the surface is maintained. During the scanning the coordinate values of the contact points of the stylus tip with the surface 70 are continuously acquired by the measuring systems and recorded by the controller 31. The controller 31 hereby may also correct the acquired measuring values with respect to different perturbation influences and convert them into desired coordinate systems. Perturbation influences thereby comprise for example previously determined non-perfect orthogonal alignments of the longitudinal guideways 35, 36, of the guiding profile 45 and the bar 55 relative to each other, bending of elements of the coordinate measuring machine due to gravitation, errors of the measuring systems, for example due to thermal expansion, and the like.

Since the initial oscillation phenomena due to the bringing into contact the stylus tip with the surface and due to the accelerating the stylus tip relative to the surface had essentially already decayed after traversing the initialization path 83, the measurement during the scanning along the scanning path 73 is essentially not disturbed by such initial oscillation processes.

Also the scanning end point 77 is traversed by the stylus tip 64 with the scanning speed such that the scanning path 73 is continued beyond the scanning end point 77 by a finalization path 85 extending up to a finalization path end point 87. At the finalization path end point 87 the contact between the stylus tip 64 and the surface 70 is released and the stylus tip is moved to an intermediate point 89 removed from the cylinder 71. The finalization path 85 continues the spiral path 73 with constant slope across a perimeter angle γ around the cylinder axis and exhibits a length Ln. However, it is also possible that the finalization path 85 is adapted as circle line extending at the height of the scanning end point 77 at the lateral surface 70 (z=constant). Equally, it is possible that the initialization path 83 is a spiral path extending already with the slope of the scanning path 73 at the lateral surface 71.

The lengths $L_v$ and $L_n$ of the initialization path 83, respectively the finalization path 85, and the corresponding perimeter angles α, γ are not constant, fixedly preset values in the coordinate measuring machine and the method, but are adapted to the given measuring situation. A stylus used in experiments with a mass of 150 gram and a stiffness of 60 N/mm is denoted as reference stylus in the following. In the experiments the cylinder with radius r of 25 mm shown in FIG. 2 was used as a workpiece.

It turned out that initial oscillation phenomena during the initialization path have decayed after 0.065 seconds and during the finalization path have decayed after 0.016 seconds. In the following table 1 the resulting initialization path angle α and finalization path angle γ for the reference stylus are given for different scanning velocities v.

TABLE 1

| v [mm/s] | α | γ |
| --- | --- | --- |
| 5 | 0.7° | 0.2° |
| 10 | 1.5° | 0.4° |
| 20 | 3.0° | 0.8° |
| 40 | 6.0° | 1.5° |

For a soft stylus, different from the reference stylus, with a mass of also 150 gram and a stiffness of 10 N/mm in experiments an adjusting time during the initialization path yielded 0.650 seconds and during the finalization path yielded 0.160 seconds in probing the same cylinder with the radius r of 25 mm. The following table 2 reflects the initialization path angle α and finalization path angle γ correspondingly evolving for different scanning velocities.

TABLE 2

| v [mm/s] | α | γ |
| --- | --- | --- |
| 5 | 7° | 2° |
| 10 | 15° | 4° |
| 20 | 30° | 8° |
| 40 | 60° | 15° |

Should besides the reference stylus still further styluses with different stiffness be employed, also for these styluses the corresponding angles α and γ are to be determined. Besides the determination of these angles by experiment it is also possible, to utilise a functional ansatz of initially arbitrary form. A linear ansatz has turned out to be sufficient in the practice.

The initialization path angle α is determined according to the following formula:

$$\alpha = \alpha_0 \cdot f$$

wherein $\alpha_0$ is the initialization path angle with the reference stylus and f is a correction factor. Similarly, for the finalization path angle α it should hold:

$$\gamma = \gamma_0 \cdot f$$

wherein $\gamma_0$ is the finalization path angle for the reference stylus and f is the same correction factor as for the initialization path angle $\alpha$. For the correction factor f the following linear ansatz illustrated in FIG. 3 is chosen:

$$f = m \cdot x + b$$

Herein x represents the stiffness of the stylus, m represents a slope of the line and b represents an offset. With the values given in the tables 1 and 2 above it yields:

$$f = -0.18 \frac{mm}{N} \cdot \text{Stiffness of the stylus} \frac{N}{mm} + 11.8$$

Similarly as the stiffness of the stylus also the mass of the stylus influences the determination of the initialization path angle $\alpha$ and the finalization path angle $\gamma$. From experiments it turned out that a stylus with the stiffness of the reference stylus however exhibiting a different mass of 600 gram requires an adjustment time for the initialization path and the finalization path twice as long as for the reference stylus. The determination of the angles $\alpha$ and $\gamma$ by experiment is also possible for other masses of the stylus. However, it is also possible to utilise an initially arbitrary functional ansatz, as follows:

$$\alpha = \alpha_0 \cdot u, \text{ and}$$

$$\gamma = \gamma_0 \cdot u,$$

wherein $\alpha_0$ and $\gamma_0$ again are the angles determined for the reference stylus and u denotes a correction factor for the mass of the stylus. Also for the correction factor u a linear ansatz according to $$u = m \cdot x + b$$

may be employed which is illustrated in FIG. 4 and wherein x denotes the mass of the stylus, m denotes a slope of the straight line and b denotes an offset.

In the given example the correction factor u for the mass of the stylus yields $$u = 0.0022 \frac{1}{g} \cdot \text{Mass of the stylus [g]} + 0.67$$

To determine the angles $\alpha$ and $\gamma$ for arbitrary combinations of stiffness of the stylus and mass of the stylus, the following combined ansatz is utilised:

$$\alpha = \alpha_0 \cdot f \cdot u, \text{ and}$$

$$\gamma = \gamma_0 \cdot f \cdot u$$

In the following table 3 for different stiffnesses and mass values of the stylus the correction factors f and u as well as initialization path angles $\alpha$ at two different velocities are given.

TABLE 3

| Stiffness [N/mm] | Mass [g] | f | u | $\alpha$ at 5 mm/s | $\alpha$ at 40 mm/s |
|---|---|---|---|---|---|
| 60 | 150 | 1 | 1 | 0.7 | 6.0 |
| 50 | 200 | 2.8 | 1.1 | 2.2 | 18.5 |
| 40 | 300 | 4.6 | 1.3 | 4.2° | 35.9° |
| 30 | 400 | 6.4 | 1.5 | 6.7° | 57.6° |
| 20 | 500 | 8.2 | 1.8 | 10.3° | 88.6° |

TABLE 3-continued

| Stiffness [N/mm] | Mass [g] | f | u | $\alpha$ at 5 mm/s | $\alpha$ at 40 mm/s |
|---|---|---|---|---|---|
| 10 | 600 | 10 | 2 | 14° | 120° |
| 5 | 700 | 10.9 | 2.2 | 16.8° | 143.9° |

The previously described initialization path angle $\alpha$ and finalization path angle $\gamma$ evolve for the example of the probing a cylinder with a radius r of 25 mm. For cylinders with other radii other initialization path and finalization path angles result.

In general the respective angles may be calculated according to the following formula:

$$s = \frac{360° \cdot v \cdot t}{d \cdot \pi},$$

wherein s represents the initialization path angle $\alpha$ or the finalization path angle $\gamma$, v represents the scanning speed, d represents the diameter of the cylinder and t represents the time span in seconds of the initial oscillation process during the initialization path, respectively the finalization path.

During probing workpieces with geometries deviating from the cylinder geometry lengths of initialization paths and finalization paths may be determined in a corresponding way from the adjustment times during the initialization path and the finalization path.

FIG. 5 explains a method for scanning a hollow cylinder 71 on a closed circle path. An inner cylinder face 70 may for example be defined as a bore in a workpiece. The stylus tip 64 is initially moved to an intermediate point 79 inside the bore and is then brought into contact with the surface 70 at an initialization path starting point 81. From there an initialization path 83 extending across a perimeter angle $\alpha$ around a central axis of the bore is traversed, wherein the stylus tip 64 is also accelerated to the scanning speed v relative to the surface 70. Then the scanning starting point 75 is traversed with the scanning speed, and the scanning path 73 extends along the inner surface of the bore across the full perimeter of the same up to the scanning end point 77 coinciding with the scanning starting point 75. The stylus tip is then further guided via a finalization path 85 up to a finalization path end point 87 from which the contact between the stylus tip 64 and the inner surface is released and the stylus tip is moved to a further intermediate point 89. In FIG. 5 the dashed line 91 represents the path of the center of the sphere-shaped stylus tip.

FIG. 6 is an illustration of the scanning a closed circle line at an outer lateral surface 70 for example defined by a cylinder shaft 71. The designation of the elements illustrated in the FIG. 6 follows in analogy to the elements of the FIG. 5 with the same reference signs.

In the embodiment of FIG. 6 the intermediate point 79 is chosen such that the stylus tip 64 tangentially approaches the surface 70 during the movement from the intermediate point 79 up to the initialization path starting point 81 such that the contact between the stylus tip 64 and the surface 70 arises in a soft way and such that the movement of the stylus tip smoothly passes into the movement along the initialization path.

In the previously exemplified embodiments the surfaces to be probed are cylinder surfaces. However, it is also possible to probe surfaces of different geometry, such as for example spherical surfaces, respectively parts there from, planes or arbitrarily shaped faces, and so on. The scanning path may also be preset as nominal scanning line and may for example derived from construction data of the workpiece. The scanning path may be a preset scanning path probed by a scanning method, wherein the movement of the probe system is carried out between two defined end points on a nominal scanning line. The scanning path may also be a non-preset scanning path probed by a scanning method, wherein the movement of the probe system between two defined borders is controlled by feedback from the probe system.

Summarized the invention provides a method and a coordinate measuring machine for probing, by scanning, a workpiece to be measured using a coordinate measuring machine, wherein a stylus tip is moved before the scanning along a scanning path along an initialization path or/and wherein the stylus tip is moved after the scanning path along a finalization path. A length of the initialization path, respectively finalization path, is chosen in dependence of parameters of a concrete measuring task, in particular in dependence of a pre-determined scanning speed, a stiffness of the stylus and/or a mass of the stylus.

What is claimed is:

1. A method for probing a surface of a workpiece to be measured using a coordinate measuring machine, the method comprising:
   bringing into contact a stylus tip of a stylus of the coordinate measuring machine with the surface of the workpiece at an initialization path starting point on the surface;
   moving the stylus tip along an initialization path extending between the initialization path starting point and a scanning starting point on the surface while maintaining the contact between the stylus tip and the surface, wherein the stylus tip substantially has, at the scanning starting point, a pre-determined scanning speed relative to the surface;
   scanning the surface with the stylus tip along a scanning path extending between the scanning starting point and a scanning end point with the scanning speed;
   wherein a length of the initialization path is determined in dependence of at least one of the pre-determined scanning speed, a stiffness of the stylus and a mass of the stylus.

2. The method according to claim 1, wherein a first workpiece is scanned in a first scanning using a first stylus tip and one of the first workpiece and a second workpiece different from the first workpiece is scanned in a second scanning using a second stylus tip different from the first stylus tip, wherein the stiffness of the stylus with respect to the first stylus tip is larger than the stiffness of the stylus with respect to the second stylus tip, and wherein the length of the initialization path before the first scanning is shorter than the length of the initialization path before the second scanning.

3. The method according to claim 2, wherein a relative difference between the stiffness of the stylus with respect to the first stylus tip and the stiffness of the stylus with respect to the second stylus tip is larger than 0.1 and wherein a relative difference between the length of the initialization path before the first scanning and the length of the initialization path before the second scanning is larger than 0.1.

4. The method according to claim 1, wherein a first workpiece is scanned in a first scanning using a first stylus tip and one of the first workpiece and a second workpiece different from the first workpiece is scanned in a second scanning using a second stylus tip different from the first stylus tip, wherein the mass of the stylus of the first stylus tip is larger than the mass of the stylus of the second stylus tip, and wherein the length of the initialization path before the first scanning is larger than the length of the initialization path before the second scanning.

5. The method according to claim 4, wherein a relative difference between the mass of the stylus of the first stylus tip and the mass of the stylus of the second stylus tip is larger than 0.1 and wherein a relative difference between the length of the initialization path before the first scanning and the length of the initialization path before the second scanning is larger than 0.1.

6. The method according to claim 1, wherein a first workpiece is scanned in a first scanning with a first scanning speed and one of the first workpiece and a second workpiece different from the first workpiece is scanned in a second scanning with a second scanning speed different from the first scanning speed, wherein the first scanning speed is larger than the second scanning speed, and wherein the length of the initialization path before the first scanning is larger than the length of the initialization path before the second scanning.

7. The method according to claim 6, wherein a relative difference between the first scanning speed and the second scanning speed is larger than 0.1 and wherein a relative difference between the length of the initialization path before the first scanning and the length of the initialization path before the second scanning is larger than 0.1.

8. The method according to claim 1, wherein the moving the stylus tip along the initialization path comprises increasing the speed of the stylus tip relative to the surface to substantially the predetermined scanning speed.

9. A method for probing a surface of a workpiece to be measured using a coordinate measuring machine, the method comprising:
   bringing into contact a stylus tip of a stylus of the coordinate measuring machine with the surface of the workpiece at a scanning starting point on the surface;
   scanning the surface with the stylus tip along a scanning path extending between the scanning starting point and a scanning end point with a predetermined scanning speed;
   moving the stylus tip along a finalization path extending between the scanning end point and a finalization path end point while maintaining the contact between the stylus tip and the surface;
   wherein a length of the finalization path is determined in dependence of at least one of the pre-determined scanning speed, a stiffness of the stylus and a mass of the stylus.

10. The method according to claim 9, wherein a first workpiece is scanned in a first scanning using a first stylus tip and one of the first workpiece and a second workpiece different from the first workpiece is scanned in a second scanning using a second stylus tip different from the first stylus tip, wherein the stiffness of the stylus with respect to the first stylus tip is larger than the stiffness of the stylus with respect to the second stylus tip, and wherein the length of the finalization path after the first scanning is shorter than the length of the finalization path after the second scanning.

11. The method according to claim 10, wherein a relative difference between the stiffness of the stylus with respect to the first stylus tip and the stiffness of the stylus with respect to the second stylus tip is larger than 0.1 and wherein a relative difference between the length of the finalization path after the first scanning and the length of the finalization path after the second scanning is larger than 0.1.

12. The method according to claim 9, wherein a first workpiece is scanned in a first scanning using a first stylus tip and one of the first workpiece and a second workpiece different from the first workpiece is scanned in a second scanning using a second stylus tip different from the first stylus tip, wherein the mass of the stylus of the first stylus tip is larger than the mass of the stylus of the second stylus tip, and wherein the length of the finalization path after the first scanning is larger than the length of the finalization path after the second scanning.

13. The method according to claim 12, wherein a relative difference between the mass of the stylus of the first stylus tip and the mass of the stylus of the second stylus tip is larger than 0.1 and wherein a relative difference between the length of the finalization path after the first scanning and the length of the finalization path after the second scanning is larger than 0.1.

14. The method according to claim 9, wherein a first workpiece is scanned in a first scanning with a first scanning speed and one of the first workpiece and a second workpiece different from the first workpiece is scanned in a second scanning with a second scanning speed different from the first scanning speed, wherein the first scanning speed is larger than the second scanning speed, and wherein the length of the finalization path after the first scanning is larger than the length of the finalization path after the second scanning.

15. The method according to claim 14, wherein a relative difference between the first scanning speed and the second scanning speed is larger than 0.1 and wherein a relative difference between the length of the finalization path after the first scanning and the length of the finalization path after the second scanning is larger than 0.1.

16. The method for probing a surface of a workpiece to be measured using a coordinate measuring machine according to claim 1, the method further comprising:
moving the stylus tip along a finalization path extending between the scanning end point and a finalization path end point while maintaining the contact between the stylus tip and the surface;
wherein at least one of a length of the initialization path and a length of the finalization path is determined in dependence of at least one of the pre-determined scanning speed, a stiffness of the stylus and a mass of the stylus.

17. The method according to claim 16, wherein a first workpiece is scanned in a first scanning using a first stylus tip and one of the first workpiece and a second workpiece different from the first workpiece is scanned in a second scanning using a second stylus tip different from the first stylus tip, wherein the stiffness of the stylus with respect to the first stylus tip is larger than the stiffness of the stylus with respect to the second stylus tip, and wherein at least one of the length of the initialization path and the length of the finalization path before, respectively after, the first scanning is shorter than at least one of the length of the initialization path and the length of the finalization path before, respectively after, the second scanning.

18. The method according to claim 17, wherein a relative difference between the stiffness of the stylus with respect to the first stylus tip and the stiffness of the stylus with respect to the second stylus tip is larger than 0.1 and wherein it holds at least one of:
a relative difference between the length of the initialization path before the first scanning and the length of the initialization path before the second scanning is larger than 0.1; and
a relative difference between the length of the finalization path after the first scanning and the length of the finalization path after the second scanning is larger than 0.1.

19. The method according to claim 16, wherein a first workpiece is scanned in a first scanning using a first stylus tip and one of the first workpiece and a second workpiece different from the first workpiece is scanned in a second scanning using a second stylus tip different from the first stylus tip, wherein the mass of the stylus of the first stylus tip is larger than the mass of the stylus of the second stylus tip, and wherein
at least one of the length of the initialization path and the length of the finalization path before, respectively after, the first scanning is larger than
at least one of the length of the initialization path and the length of the finalization path before, respectively after, the second scanning.

20. The method according to claim 19, wherein a relative difference between the mass of the stylus of the first stylus tip and the mass of the stylus of the second stylus tip is larger than 0.1 and wherein it holds at least one of:
a relative difference between the length of the initialization path before the first scanning and the length of the initialization path before the second scanning is larger than 0.1; and
a relative difference between the length of the finalization path after the first scanning and the length of the finalization path after the second scanning is larger than 0.1.

21. The method according to claim 16, wherein a first workpiece is scanned in a first scanning with a first scanning speed and one of the first workpiece and a second workpiece different from the first workpiece is scanned in a second scanning with a second scanning speed different from the first scanning speed, wherein the first scanning speed is larger than the second scanning speed, and wherein
at least one of the length of the initialization path and the length of the finalization path before, respectively after, the first scanning is larger than
at least one of the length of the initialization path and the length of the finalization path before, respectively after, the second scanning.

22. The method according to claim 21, wherein a relative difference between the first scanning speed and the second scanning speed is larger than 0.1 and wherein it holds at least one of:
a relative difference between the length of the initialization path before the first scanning and the length of the initialization path before the second scanning is larger than 0.1; and
a relative difference between the length of the finalization path after the first scanning and the length of the finalization path after the second scanning is larger than 0.1.

23. The method according to claim 16, wherein the length of the initialization path is larger than the length of the finalization path.

24. The method according to claim 9, wherein the moving the stylus tip along the finalization path comprises a reducing the speed of the stylus tip relative to the surface to substantially zero.

25. The method according to claim 1, wherein the scanning speed is substantially constant during the scanning along the scanning path.

26. The method according to claim 1, wherein the surface is a lateral surface of a cylinder.

27. The method according to claim 26, wherein the scanning path engages the lateral surface in a direction of a perimeter of the cylinder at least once.

28. The method according to claim 27, wherein a height z of the scanning path continuously increases in a direction of an axis of the cylinder.

29. The method according to claim 27, wherein the scanning path is a closed path engaging the lateral surface in a direction of a perimeter of the cylinder once.

30. A coordinate measuring machine for probing a surface of a workpiece to be measured, wherein the coordinate measuring machine comprises:
- workpiece holder for holding the workpiece to be measured;
- a measuring system with a stylus for probing the surface of the workpiece;
- plural components displaceable relative to each other one of which is rigidly connected to the workpiece holder and another one carries the measuring system such that the measuring system is spatially displaceable relative to the workpiece holder;
- at least one drive for displacing the plural components relative to each other;
- a controller for controlling the at least one drive, wherein the controller is configured to perform the method according to claim 1.

31. Computer readable carrier comprising information representing a controlling program that is adapted to cause a controller of a coordinate measuring machine to perform the method according to claim 1.

32. The method according to claim 9, wherein the scanning speed is substantially constant during the scanning along the scanning path.

33. The method according to claim 9, wherein the surface is a lateral surface of a cylinder.

34. A coordinate measuring machine for probing a surface of a workpiece to be measured, wherein the coordinate measuring machine comprises:
- a workpiece holder for holding the workpiece to be measured;
- a measuring system with a stylus for probing the surface of the workpiece;
- plural components displaceable relative to each other one of which is rigidly connected to the workpiece holder and another one carries the measuring system such that the measuring system is spatially displaceable relative to the workpiece holder;
- at least one drive for displacing the plural components relative to each other;
- a controller for controlling the at least one drive, wherein the controller is configured to perform the method according to claim 9.

35. Computer readable carrier comprising information representing a controlling program that is adapted to cause a controller of a coordinate measuring machine to perform the method according to claim 9.

36. The method according to claim 33, wherein the scanning path engages the lateral surface in a direction of a perimeter of the cylinder at least once.

37. The method according to claim 33, wherein a height z of the scanning path continuously increases in a direction of an axis of the cylinder.

38. The method according to claim 33, wherein the scanning path is a closed path engaging the lateral surface in a direction of a perimeter of the cylinder once.

* * * * *